UNITED STATES PATENT OFFICE.

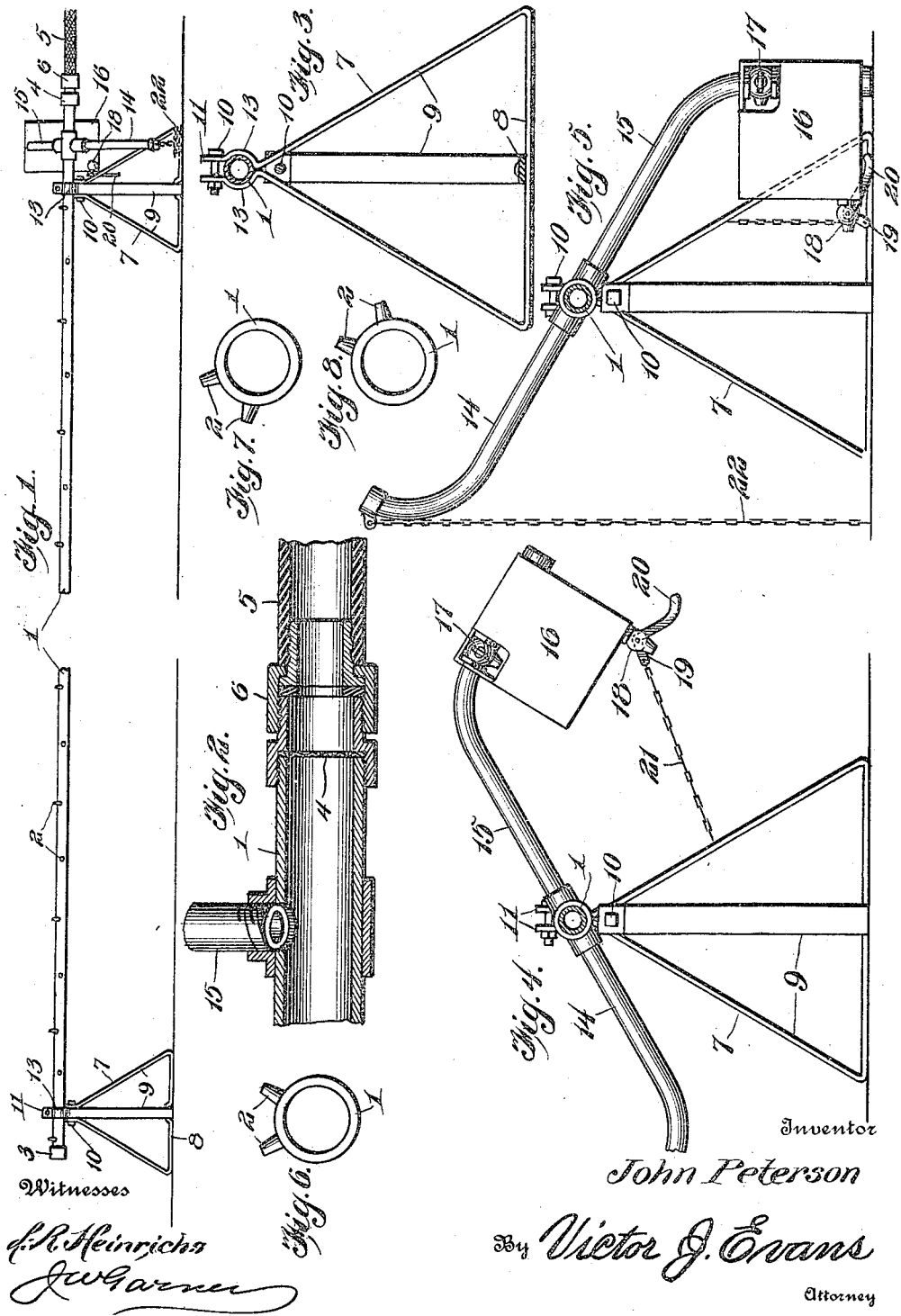

JOHN PETERSON, OF LAKE GEORGE, NEW YORK.

SPRINKLING APPARATUS.

1,281,202.　　　　　Specification of Letters Patent.　　Patented Oct. 8, 1918.

Application filed April 6, 1918. Serial No. 227,014.

*To all whom it may concern:*

Be it known that I, JOHN PETERSON, a citizen of the United States, residing at Lake George, in the county of Warren and State of New York, have invented new and useful Improvements in Sprinkling Apparatus, of which the following is a specification.

This invention is an improved sprinkling apparatus, for use for irrigation purposes, sprinkling lawns, flower beds and the like and embodying a pipe line provided with portable supports and which may be readily moved from place to place, the object of the invention being to provide automatically operating means, controlled by water pressure, for turning the pipe so as to cause it to sprinkle first from one side and then from the other, when the water pressure is low, the pipe and its discharge openings being adapted to sprinkle from opposite sides when the water pressure is high.

The invention consists in the construction, combination and arrangement of devices hereinafter described and claimed.

In the accompanying drawings;

Figure 1 is a side elevation of a sprinkling apparatus constructed in accordance with my invention.

Fig. 2 is a detail longitudinal sectional view of the same, on a larger scale.

Fig. 3 is a vertical sectional view of the same.

Figs. 4 and 5 are similar views, on a plane disclosing the oscillating lever arms and partially intersecting the water weight, Fig. 4 showing the sprinkling apparatus in one position and Fig. 5 showing it in another position.

Figs. 6, 7 and 8 are detail end elevations of the oscillating pipe, showing the same in different positions and with the flushing plug removed.

In accordance with my invention I provide a pipe line 1 of any suitable length and diameter and which is provided near opposite sides of the pipe with sprinkling orifices 2, which when the device is used under strong water pressure are at opposite sides of the pipe line, to sprinkle from opposite sides thereof, and while the pipe line is stationary. At the discharge end of the pipe or pipe line is a flushing plug 3 which may be removed when desired. At the intake end of the pipe is a strainer 4 to which a flexible hose or other suitable feed pipe 5, which leads from a surface pipe or other source of water under pressure, is attached by means of a suitable coupling 6.

The pipe 1 is mounted for oscillating movement on a series of supports 7, which are suitably spaced. Each of these supports comprises crossed base arms 8 from which rise upwardly converging inclined arms 9 which are secured together by bolts or other suitable devices near their upper ends as at 10. In practice each support is made of two like pieces of band iron or steel. Two of the arms 9 have upwardly extending portions 11 which are outwardly bent and curved as at 13 to form cages or loose bearings for the pipe 1 between them and to permit the pipe to oscillate and roll first in one direction and then in the reverse direction so as to cause its discharge orifices to spray either from both sides of the pipe simultaneously as when the pressure is high or first to one side and then to the other of the pipe as when the pressure is low.

I will now describe my improved automatically operating means, controlled by variations in water pressure, for oscillating the pipe when the pressure is low and permit the pipe to remain stationary when the water pressure is high.

The pipe 1 is provided with a pair of oppositely extending and oppositely curved arms 14, 15, which are arranged substantially at right angles thereto, the said arm 15 being tubular and communicating with said pipe 1. Near the outer end of the tubular arm 15 is a water weight tank 16 which may be supplied with water from the pipe 1, through the tubular arm 15, by a controlling valve 17 which may be adjusted as desired. At the lower outer corner of the water weight tank is a discharge valve 18 which has an arm 19 for turning it in one direction, to close said valve and a tappet arm 20 to come in contact with the ground when the lower weight tank is lowered, to turn said valve in the reverse direction and open it. The arm 19 is connected by a cord or chain 21 with one of the supports 9, the length of the cord or chain being such that when the water weight tank is in elevated position said tank will be put under tension and operate on the lever 19 to close the discharge valve 18. A variable weight is attached to the outer end of the arm 14 and is here shown as a chain 22 sufficiently long to bear at its lower end on the ground when the arm 14 is raised. The higher the arm 14 is raised the greater the effective weight of the chain, as will be understood.

In the operation of my invention, when there is a high pressure of water, the pipe 1 will be arranged so that its discharge openings will be at opposite sides and the pipe will spray water from opposite sides thereof, the feed valve 17 of the water weight tank being kept closed. When the water pressure is lower and it is desired to cause the pipe 1 to oscillate so that the openings will discharge spray first from one side and then from the other side of the pipe the feed valve 17 of the water weight tank will be opened. Assuming that initially the water weight tank is raised and the arm 14 is lowered by the pull of the weight chain 22, the pipe 1 and arms 14, 15 will remain in the position shown in Fig. 4 until water has accumulated in the water weight tank 1 sufficiently to overbalance the arm 14 and the chain 22 so that said tank will descend thereby causing the arm 15 to slowly turn the pipe 1 in one direction and direct all of its discharge openings to one side. This movement continues by the accumulation of water in the tank 16 until the tappet arm 20 of the valve 18 reaches the ground. Said tappet arm by contact with the ground opens the discharge valve 18, thereby discharging the water from the tank 16 and the weight 22 then preponderates and lowers the arm 14, thus turning the pipe 1 in the reverse direction, to cause it to discharge spray from the opposite side. As the water weight tank 16 reaches the upper limit of its movement the cord or chain 21 tightens thereby causing the arm 19 to close the discharge valve 18 whereupon water from the valve 17 again accumulates in the water weight tank and the action is repeated.

Having thus described my invention I claim:—

A sprinkling pipe arranged for oscillating movement on the elevating supports and having a pair of oppositely extending lever arms, one of which is tubular, a feed valve attached to said tubular arm, a water weight tank also attached to said tubular arm and fed by said feed valve, a discharge valve for said water weight tank, means to open said discharge valve when said tank is lowered and to close said discharge valve when said tank is raised, and a variable weight attached to the other lever arm.

In testimony whereof I affix my signature in presence of two witnesses.

JOHN PETERSON.

Witnesses:
CHRISTIAN PEDERSEN,
AUGUST ERICKSON.

Copies of this patent may be obtained for five cents each, by addressing the "Commissioner of Patents, Washington, D. C."